United States Patent [19]

Abe et al.

[11] Patent Number: 5,515,174
[45] Date of Patent: May 7, 1996

[54] CAMERA-INTEGRATED VIDEO RECORDER APPARATUS HAVING A CONCEALABLE OPERATION MEMBER

[75] Inventors: Takeshi Abe, Kanagawa; Chifuyu Tanaka, Tokyo; Kenichi Nagasawa, Kanagawa, all of Japan

[73] Assignee: Canon Kabushiki Kaisha, Tokyo, Japan

[21] Appl. No.: 260,677

[22] Filed: Jun. 16, 1994

Related U.S. Application Data

[63] Continuation of Ser. No. 896,834, Jun. 11, 1992, abandoned.

[30] Foreign Application Priority Data

| Jun. 18, 1991 | [JP] | Japan | 3-145994 |
| Jun. 18, 1991 | [JP] | Japan | 3-145998 |
| Jun. 18, 1991 | [JP] | Japan | 3-145999 |

[51] Int. Cl.⁶ .................................... H04N 5/225
[52] U.S. Cl. ........................ 358/335; 358/906; 348/376; 348/211
[58] Field of Search ................... 358/335, 906, 358/909.1; 348/207, 211, 373, 375, 376; 360/33.1; H04N 5/225

[56] References Cited

U.S. PATENT DOCUMENTS

| 4,695,905 | 9/1987 | Utsugi | 360/33.1 |
| 4,837,817 | 6/1989 | Maemori | 348/211 |
| 4,885,643 | 12/1989 | Ichimura et al. | 358/906 |
| 5,355,228 | 10/1994 | Mizuno et al. | 358/335 |

FOREIGN PATENT DOCUMENTS

| 0310114 | 4/1989 | European Pat. Off. ...... G11B 15/665 |
| 0400944 | 12/1990 | European Pat. Off. . |
| 0210778 | 11/1984 | Japan . |
| 61-177870 | 8/1986 | Japan ............................. H04N 5/225 |
| 62-105580 | 5/1987 | Japan ............................. H04N 5/225 |
| 62-105579 | 5/1987 | Japan ............................. H04N 5/225 |
| 0001768 | 1/1991 | Japan . |
| 3038167 | 2/1991 | Japan ............................. H04N 5/225 |
| 0068278 | 3/1991 | Japan . |
| 3133267 | 6/1991 | Japan ............................. H04N 5/225 |
| 4-120881 | 4/1992 | Japan . |

Primary Examiner—Tommy P. Chin
Assistant Examiner—Khoi Truong
Attorney, Agent, or Firm—Robin, Blecker, Daley & Driscoll

[57] ABSTRACT

A camera-integrated type video recorder apparatus having a camera part and a recorder part which records an image pickup signal outputted from the camera part comprises a grip which is provided for holding the apparatus in a shooting state and is arranged near to a cassette mounting part which is provided for mounting and demounting a tape cassette on and from the recorder part, and an operation part which is openably and closably arranged near to the cassette mounting part and includes a plurality of operation keys for operations on the apparatus. When the apparatus is held in the shooting state, the grip and the operation part jointly close the cassette mounting part. When the grip and the operation part are in an open state, the tape cassette is mountable and demountable while the operation part is held in a predetermined operating position. Further, while the apparatus is in the shooting state, the operation keys are kept in an inoperable position.

18 Claims, 9 Drawing Sheets

CAMERA-INTEGRATED VIDEO RECORDER APPARATUS HAVING A CONCEALABLE OPERATION MEMBER

This is a continuation of application under 37 CFR 1.62 of prior application Ser. No. 07/896,834, filed Jun. 11, 1992, now abandoned.

BACKGROUND OF THE INVENTION

1. Field of the Invention

This invention relates to a camera-integrated type video recorder having a camera part and a recorder part which records an image pickup signal outputted from the camera part arranged within a single casing.

2. Description of the Related Art

The reduction in size of the camera-integrated type video recorder (hereinafter referred to as a VTR) of the above-stated kind has made salient progress during recent years. The size reduction gives an impetus to the further popularization of the apparatus of this kind.

On the VTR of this kind, spaces to be allocated to the various operation members related to image pickup, recording and reproducing functions decrease as the reduction in size of the VTR progresses. As a result, these operation members now tend to become smaller.

To meet this trend, it has been contrived to arrange one and the same operation member to be usable for various functions. However, the use of one and the same operation member for combined functions increases the possibility of causing the operator to erroneously operate the operation members.

Further, with many operation members arranged within limited spaces available on the camera-integrated type VTR, the operation members relative to image pickup, recording and reproduction tend to be allocated together in a commingled state on both sides of the camera body of the VTR. In shooting, an erroneous operation tends to be caused by the commingled state of the operation members.

In addition to the above-stated problem, the conventional camera-integrated type VTR has been designed with not much heed taken to the operability of the VTR for the recorder operations other than the normal image pickup operation, such as reproduction of a video signal recorded on a magnetic tape, recording some external input signals, or for mounting and demounting a magnetic tape cassette. While the lack of heed to such operability is permissible for a video camera, it leaves room for further improvement in operability for the camera-integrated type VTR as a whole system.

SUMMARY OF THE INVENTION

This invention is directed to the solution of the problems mentioned in the foregoing. It is, therefore, an object of the invention to provide a camera-integrated type video recorder apparatus which has improved operability.

To attain this object, a camera-integrated type video recorder apparatus arranged as an embodiment of this invention to have a camera part and a recorder part which records an image pickup signal outputted from the camera part disposed within a single casing comprises a grip for keeping the apparatus in a shooting state, the grip being arranged to be openable and closable in the vicinity of a cassette mounting part arranged to mount and demount a tape cassette on and from the recorder part; and an operation part arranged to be operable and closable in the vicinity of the cassette mounting part and having a plurality of operation keys for operating the apparatus, the grip and the operation part being arranged such that, when the apparatus is held in the shooting state, the cassette mounting part is kept closed jointly by the grip and the operation part and, when the grip and the operation part are in an open state, the cassette mounting part is enabled to mount and demount the tape cassette and the operation part is kept in a predetermined operating position.

In the case of this embodiment, the operation keys are kept in inoperable positions when the apparatus is held in a shooting state.

It is another object of the invention to provide a camera-integrated type video recorder apparatus which can be stably set in the case of a reproducing operation, in addition to the attainment of the above-stated improvement in operability.

To attain that object, a camera-integrated type video recorder apparatus is arranged to have operation keys related to reproduction and a mounting mechanism for mounting a recording medium disposed on one side of a body of the recorder apparatus and to have a plurality of leg parts disposed on the other side of the body for the purpose of supporting the body.

These and other objects and features of this invention will become apparent from the following detailed description of embodiments thereof taken in connection with the accompanying drawings.

DETAILED DESCRIPTION OF THE PREFERRED EMBODIMENTS

Figure 1:
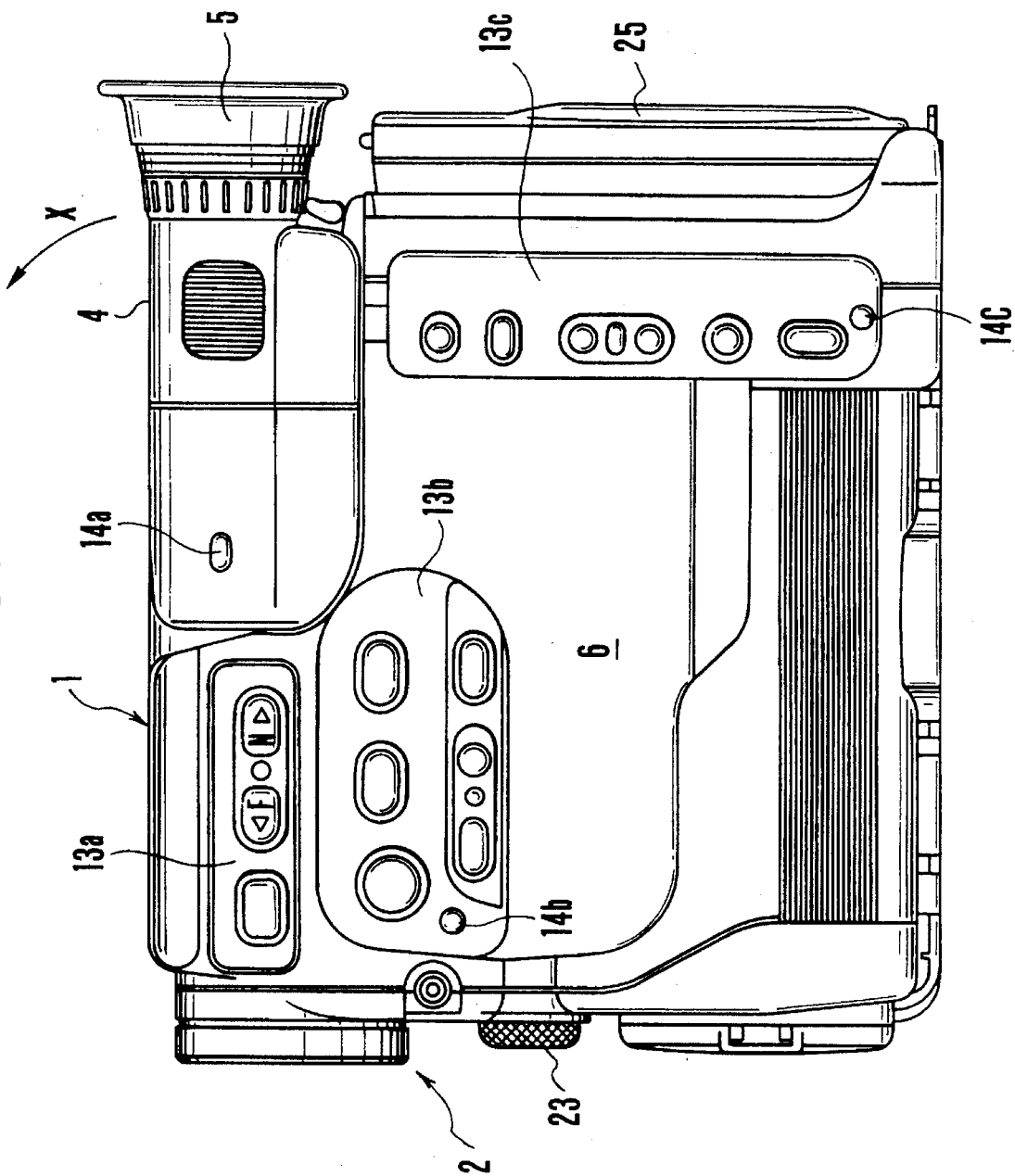
FIG. 1 is a right side view showing the structure of a camera-integrated type VTR which is arranged as an embodiment of this invention.

The following describes the details of this invention through an embodiment thereof:

FIGS. 1 to 6 show the structure of a camera-integrated type VTR which is arranged according to this invention. FIG. 1 is a right side view, FIG. 2 a front view, FIG. 3 a top view, FIG. 4 a left side view and FIGS. 5 and 6 oblique views showing the VTR in different operating states. Reference numerals are used in common for all these figures.

Referring to these figures, an optical system housing part 1 is arranged to house an image pickup optical system consisting of a lens aperture part 2 and several lenses. The image pickup optical system of this embodiment includes a rear focusing type lens unit wherein the lens located nearest to an object to be shot is not moved in varying the focal length and in adjusting focus. As well known, it is a disadvantage of the rear focusing type that the control over the position of a driven lens is complex. However, it is an advantage of this type that the lens unit can be arranged to have a short length in the direction of its optical axis. The details of the rear focusing type lens unit are well known and, therefore, are omitted from the description given herein.

The optical system housing part 1 is, as shown in the figures, disposed on the object side of the VTR body and houses the above-stated lens unit within its cylindrical part. A support part (not shown) which is arranged to turnably support an electronic viewfinder 1 hereinafter referred to as EVF) unit 4 is disposed on the right side face of a narrow width part 3 which is formed in one body with the cylindrical part. The EVF unit 4 is arranged to be turnable on a portion of the support part near to the optical system housing part 1. More specifically, an eyepiece part 5 of the EVF unit 4 is arranged to be movable in the direction of arrow X as shown in FIG. 1, so that low-angle shooting can be performed without difficulty.

The EVF unit 4 consists of a small monitor which is a CRT or a liquid crystal display device and an optical system which is provided for guiding an image obtained at the small monitor to the eyepiece part 5. The EVF unit 4 is disposed in such a position that, in a normal shooting state as shown in FIG. 1, the optical path of the optical system within the EVF unit 4 and the optical path of the above-stated image pickup optical system overlap each other on the extended lines of these optical paths as viewed from the front side of the VTR. This arrangement permits effective use of space available on the upper side of a VTR casing 6. Since the optical path of the optical system located within the EVF unit 4 is very close to that of the image pickup optical system, they give a very small parallax. Further, with the EVF unit 4 arranged also on the upper side of the VTR casing 6, the operator can shoot objects by holding the camera-integrated type VTR with the eye at the eyepiece part 5 in a posture of tightly closing the armpit. Therefore, holding the VTR for shooting imposes little burden on the operator.

The VTR casing 6 contains therein mechanisms such as a rotary head drum, a cassette housing support part, etc., and electric circuits. As apparent from FIGS. 1 to 6, the optical system housing part 1 and the EVF unit 4 are arranged on the upper side of the VTR casing 6. This arrangement enables the total thickness of the camera-integrated type VTR to be held approximately to the minimum necessary thickness of the VTR casing 6.

On the upper surface of the VTR casing 6, a zoom switch 7 for variation of the focal length is disposed on the left side of the above-stated narrow width part 3 for effective space utilization. More specifically, in the case of this embodiment, the camera-integrated type VTR is arranged to be held from the left side of the VTR casing 6 as will be further described later herein. The zoom switch 7 must be located at a part where a finger is placed on the left side of the VTR casing 6. In the case of this VTR, a rear space resulting from shortening the length of the optical system housing part 1 is allocated to the zoom switch 7. The space is thus effectively utilized.

Figure 5:
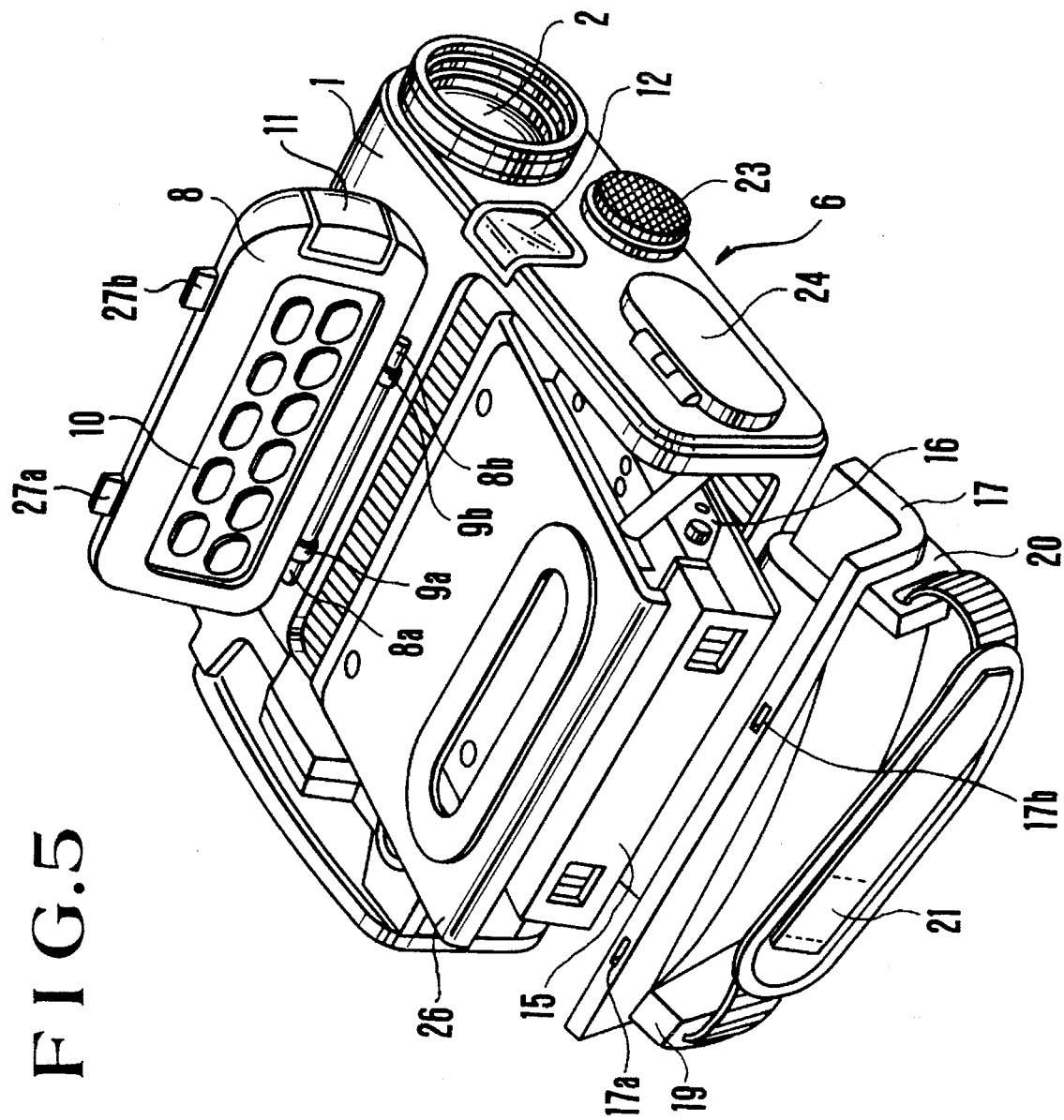
FIG. 5 is an oblique view showing the structure of the embodiment of the invention.
Figure 6:
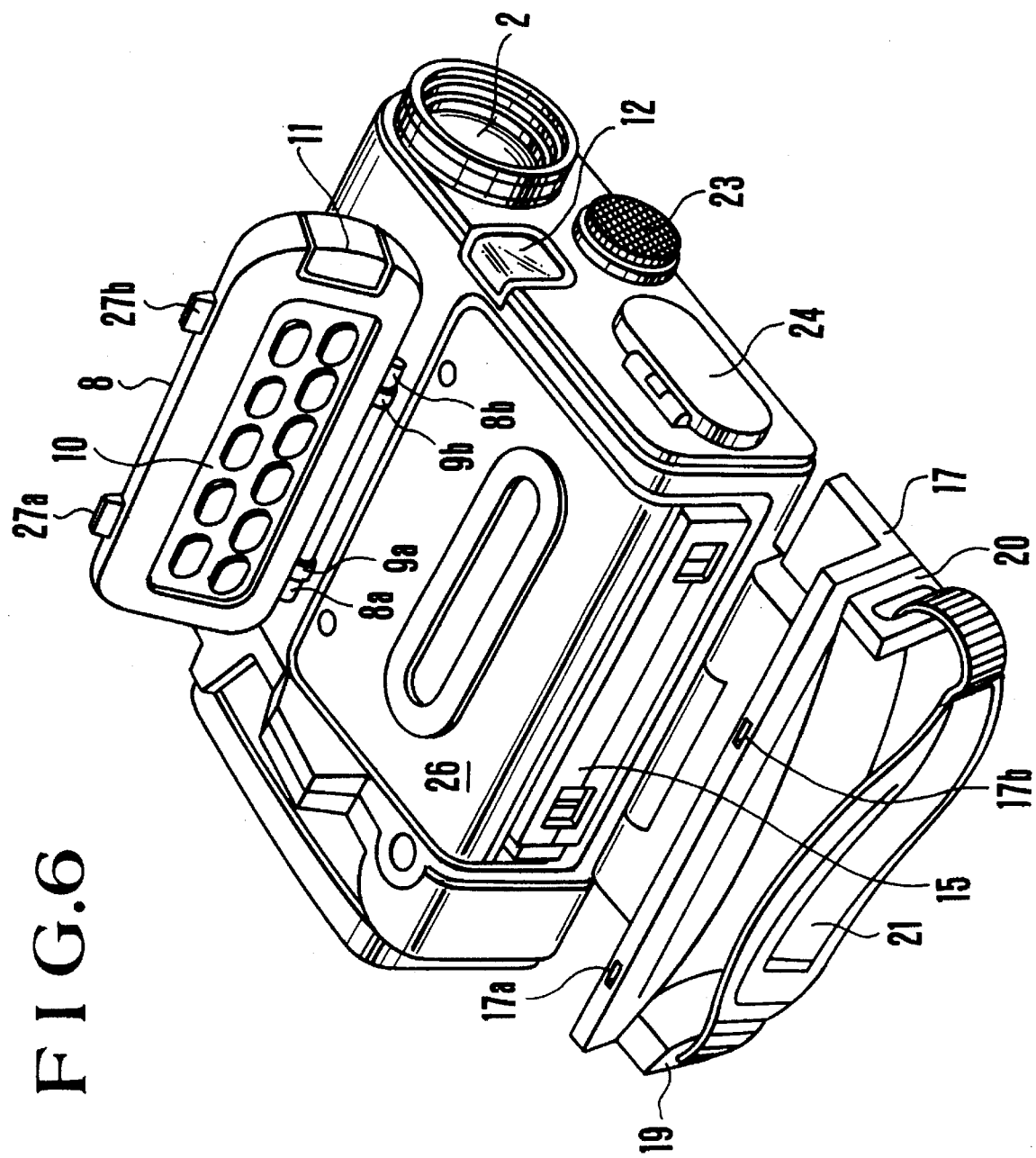
FIG. 6 is an oblique view showing the structure of the embodiment of the invention in an operating state which differs from the state shown in FIG. 5.

As apparent from FIGS. 5 and 6, a cassette mounting part 26 is arranged on the left side of the VTR casing 6 for mounting and demounting a tape cassette. The cassette mounting part 26 includes a cassette mounting mechanism which is arranged to receive the tape cassette from outside and to set it in a given mounting position provided within the VTR casing 6.

Figure 2:
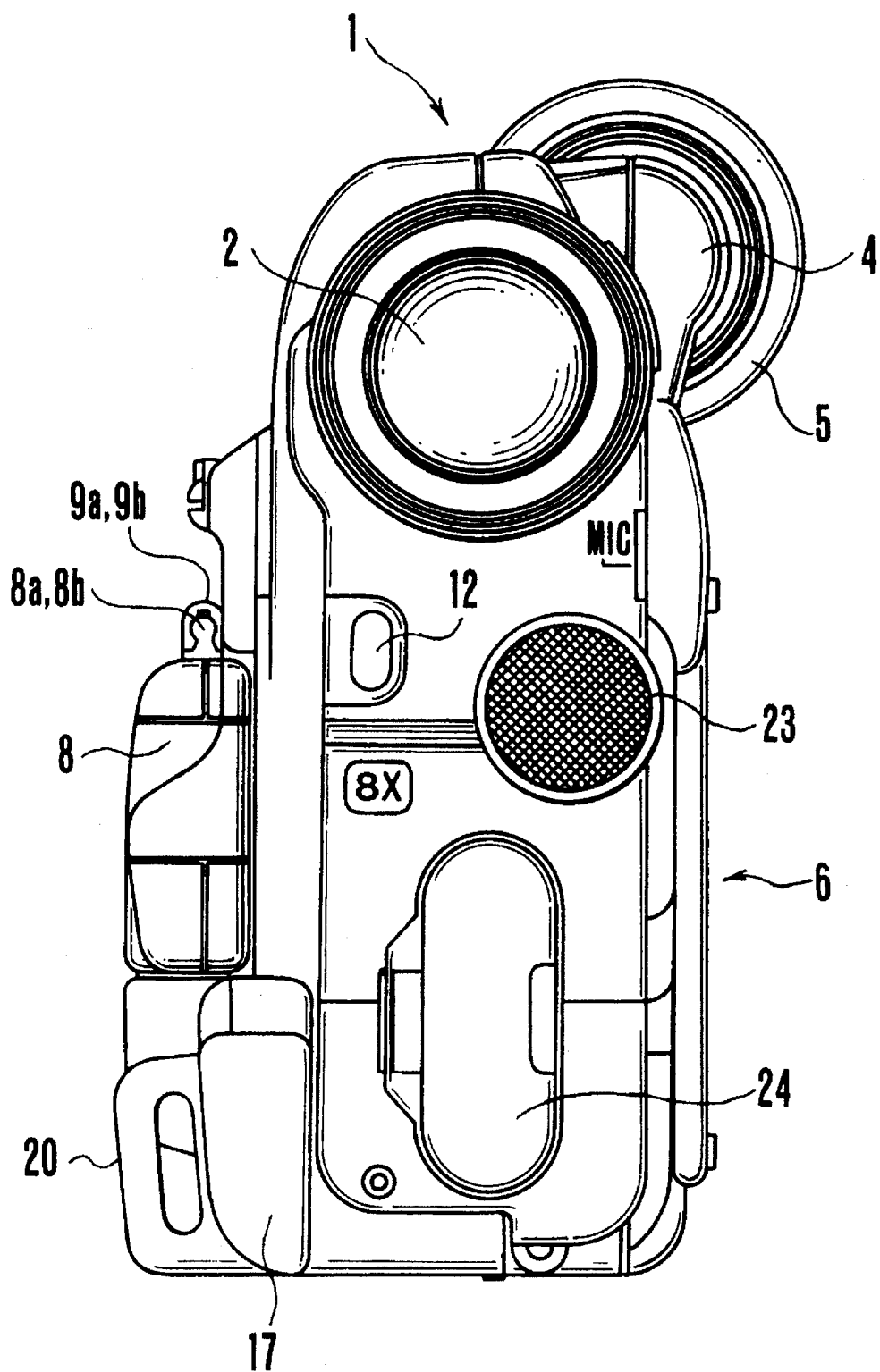
FIG. 2 is a front view showing the structure of the embodiment of the invention.
Figure 3:
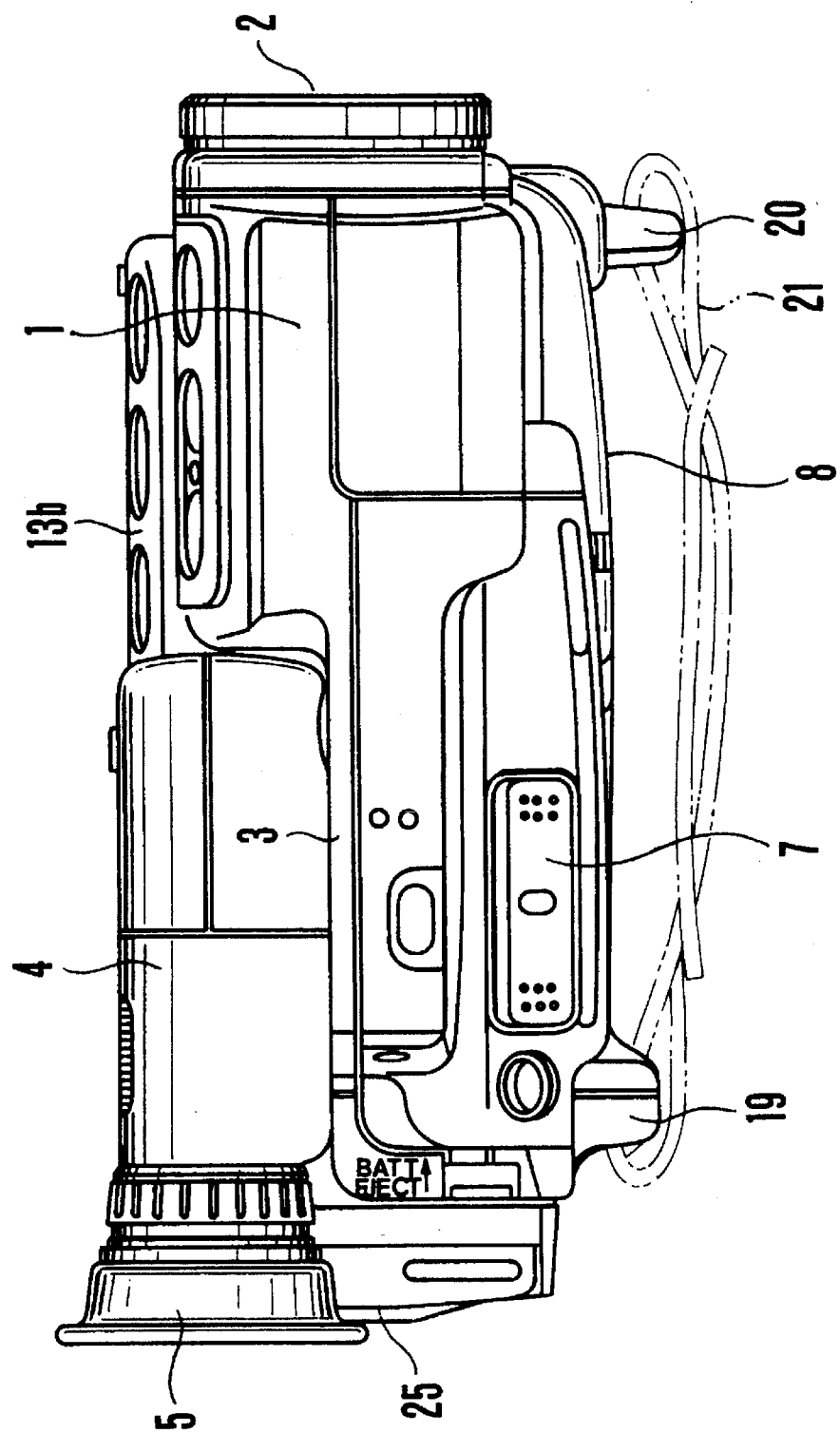
FIG. 3 is a top view showing the structure of the embodiment of the invention.

A remote controller 8 forms a grip for holding the camera-integrated type VTR. As shown in FIGS. 1 and 2, the remote controller 8 is openably and closably arranged over an opening part provided on the left side of the VTR casing 6 for mounting and demounting the tape cassette. The engaging parts 8a and 8b of the remote controller 8 are connected in a hinged manner to engaging parts 9a and 9b disposed on the left side of the VTR casing 6. The remote controller 8 is thus arranged to be turnable about 120 degrees on the engaging part 8a and 8b. The engaging parts 9a and 9b are made of, for example, a synthetic resin and has elasticity, so that the remote controller 8 is mountable and demountable by pushing the engaging parts 8a and 8b against the engaging parts 9a and 9b in such a way as to elastically deform them.

As shown in FIG. 5, on the reverse side of the remote controller 8, there is provided an operation part 10 which includes a plurality of operation keys. All the actions related to the reproducing operation of the camera-integrated type VTR can be caused to be done by operating these keys of the operation parts 10. For example, normal reproduction, special reproduction, a high speed tape feeding action, pause, a cueing search action, a sound change-over action and so on can be caused to be carried out by operating the operation keys. It goes without saying that the actions related to shooting such as recording start/stop actions, a zooming magnification varying action, a date or title inserting action, a fading action and so on also can be accomplished by operating the operation part 10.

In shooting, the use of the operation part 10 is prevented as follows: in this instance, lock claws 27a and 27b which are formed on one side opposite to the end part where the engaging parts 8a and 8b are disposed are caused to engage lock holes 17a and 17b formed in a cover 17 which will be described later. The cassette mounting part 26 is thus protected by the remote controller 8 in conjunction with the cover 17. Further, an infrared ray emitting part 11 which is arranged to output information on each operation in the form of infrared rays is disposed on the front part of the remote controller 8. The infrared rays from the infrared ray emitting part 11 is arranged to be received by an infrared ray receiving part 12 which is disposed on the front left side of the VTR casing 6 and to be then inputted to a system control part (not shown) which is disposed inside the VTR casing 6.

As shown in FIG. 2, the remote controller 8 is arranged to hide the operation part 10 and to act as a part of a grip at the time of shooting. However, in cases where only the VTR part other than the camera shooting part is to be operated, the operation part 10 is opened and exposed by turning 120 degrees the remote controller 8, as shown in FIG. 5. Referring to FIG. 1, on the right side of the VTR, there are provided operation boards 13a, 13b and 13c on which operation keys are arranged to be used for shooting. In addition to these operation keys, there are provided projection parts 14a, 14b and 14c which are arranged to serve as legs when the camera-integrated type VTR is placed on a flat surface. In that instance, therefore, the VTR is supported at three points by these legs and thus can be stably set. FIGS. 5 and 6 show the VTR in this stably set state.

With the camera-integrated type VTR thus placed on a flat surface as shown in FIGS. 5 and 6, the VTR is three-point supported very stably by the projection parts 14a, 14b and 14c. Another advantage of the embodiment lies in that the operation keys for reproduction are disposed in a state of slanting at an angle of about 60 degree under this condition, as shown in FIGS. 5 and 6. This state enables the operator to operate these keys with a feeling similar to an operation on an reproduction set installed. Further, while the VTR is arranged to be very stably supported at three points in the case of this embodiment, this supporting arrangement may be changed to support the VTR at four points with four leg parts in a manner generally employed for electronic equipment.

A tape cassette 15 is set in a predetermined position within the VTR casing 6 by means of a cassette holder 16 which forms a cassette mounting mechanism within the cassette mounting part 26 located on the left side of the VTR casing 6 (see FIG. 6). The tape cassette 15 can be ejected out from the VTR by popping up the cassette holder 16 (see FIG. 5). Since the optical system housing part 1 and the EVF unit 4 are disposed on the upper side of the VTR casing 6 in the case of this embodiment, the VTR is arranged to have the tape cassette 15 ejected downward from the VTR casing 6. This arrangement enables the tape cassette 15 to be inserted and taken out without increasing the amount of the pop-up movement of the cassette holder 16 despite the presence of the optical system housing part 1 in the upper part of the VTR casing 6. The cassette mounting mechanism thus can be compactly arranged to further facilitate a reduction in thickness of the VTR as a whole.

Figure 4:
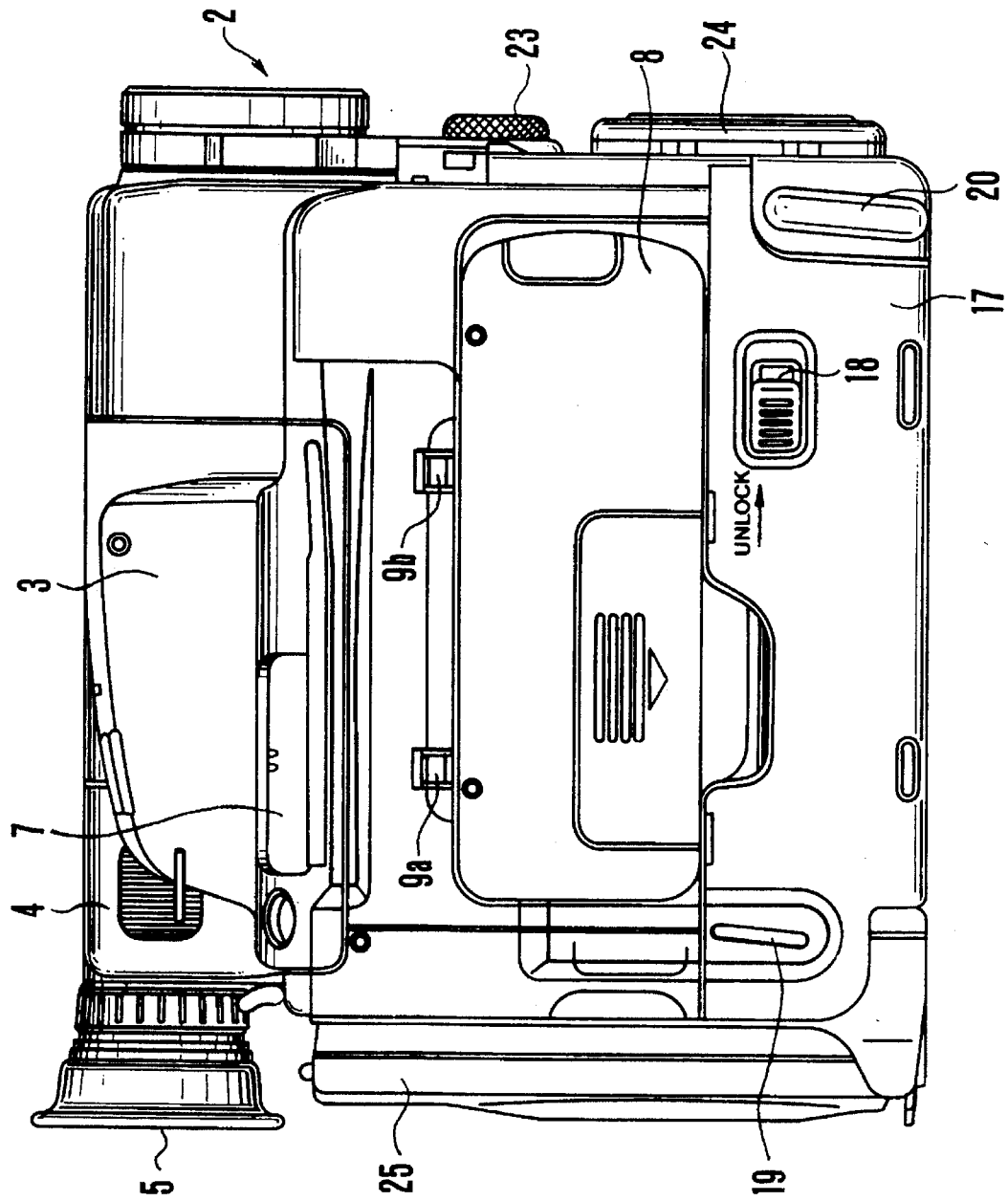
FIG. 4 is a left side view showing the structure of the embodiment of the invention.

A cover 17 is arranged to cover, in conjunction with the remote controller 8, the cassette mounting part 26 which is provided for mounting and demounting the tape cassette 15. In addition to that, the cover 17 serves as a grip for holding the camera-integrated type VTR in its shooting posture. The cover 17 is turnable on a supporting part disposed on the lower side of the VTR casing 6. With the VTR in the shooting posture, the cover 17 is in a state as shown in FIGS. 2 and 4 and is locked by a lock mechanism which is not shown. In this instance, the tape cassette 15 has been of course completely loaded. The cover 17 can be unlocked by means of an unlocking operation lever 18.

At both ends of the cover 17, there are provided hooks 19 and 20 for a holding belt 21 which is arranged to hold the back of a holding hand. In shooting, the hand is passed through the belt 21 with a lower part of the palm of the hand applied to the locked cover 17. The middle of the palm then comes to the remote controller 8, so that the VTR body can be adequately held in this manner. The dimensions of the parts participating in camera holding are determined in such a way as to permit the index and middle fingers of the hand to operate the zoom switch 7.

In shooting, therefore, the camera position can be stably retained by virtue of the grip provided jointly by the cover 17 and the remote controller 8 which are closed on the VTR casing 6. In cases where the VTR is to be operated for the VTR functions other than the image pickup function, such as reproduction, etc., the tape cassette 15 can be mounted or demounted by opening the cover 17 as shown in FIG. 5 or 6. In addition to that, the embodiment can be operated like an ultra-compact installed type VTR with the operation keys set aslant upward by turning the remote controller 8.

Further, a microphone 23 and a cover 24 for input and output terminals are disposed on front face of the VTR casing 6. A battery 25 can be mounted in the rear face. The whole surfaces of the VTR casing 6 is thus effectively used.

In accordance with the invented arrangement of the camera-integrated type VTR described, the grip which is provided for holding the VTR in a shooting (and image pickup) state and is arranged to be openable and closable and the operation part which includes a plurality of operation keys are disposed near to the cassette mounting part. In shooting, the grip is set in a position where the VTR can be stably held in the shooting and image pickup state and closes the cassette mounting part in conjunction with the openable and closable operation part. Therefore, the recorder part of the VTR can be prevented from being unnecessarily pushed, from vibrations, from intrusion of dust and from an erroneous action.

Further, in shooting, all the operation keys that are unnecessary for shooting and image pickup are prevented from being exposed to the outside by closing the operation part, so that any erroneous action can be prevented. Meanwhile, in cases where the recorder part is to be used for reproduction, etc., the grip is opened to permit mounting or demounting of the tape cassette on or from the VTR. In that instance, the operation part is set in a predetermined operating position, so that the operability can be improved for the use of the recorder part.

In the case of the camera-integrated type VTR of this embodiment, the reproducing operation keys which relate to reproduction and the recording medium mounting mechanism are disposed on one side of the video camera body. A plurality of leg parts are provided on the other side for the purpose of supporting the video camera (VTR) body. This arrangement lessens the possibility of an erroneous operation on each of the operation members for the image pickup, recording and reproducing functions. In addition to this advantage, the VTR body can be stably set on a flat surface by virtue of the above-stated leg parts to ensure a great improvement in operability.

The method for operating the remote controller 8 is described below with reference to FIGS. 7 to 9.

In shooting, lock claws 27a and 27b which are provided on the remote controller 8 are locked to the lock holes 17a and 17b which are formed in the cover 17 in such a way as to hide the operation part 10 as shown in FIG. 5. The remote controller 8 is then pushed in the direction of arrow A by the urging forces of engaging parts 9a and 9b. The cover 17 is, therefore, reliably held in place. Under this condition, the remote controller 8 functions as a part of the grip. However, in a case where only the VTR part is to be operated, i.e., at the time of reproduction, the remote controller 8 is turned about 120 degrees to expose the operation part 10, as indicated with broken lines in FIG. 7.

Figure 7:
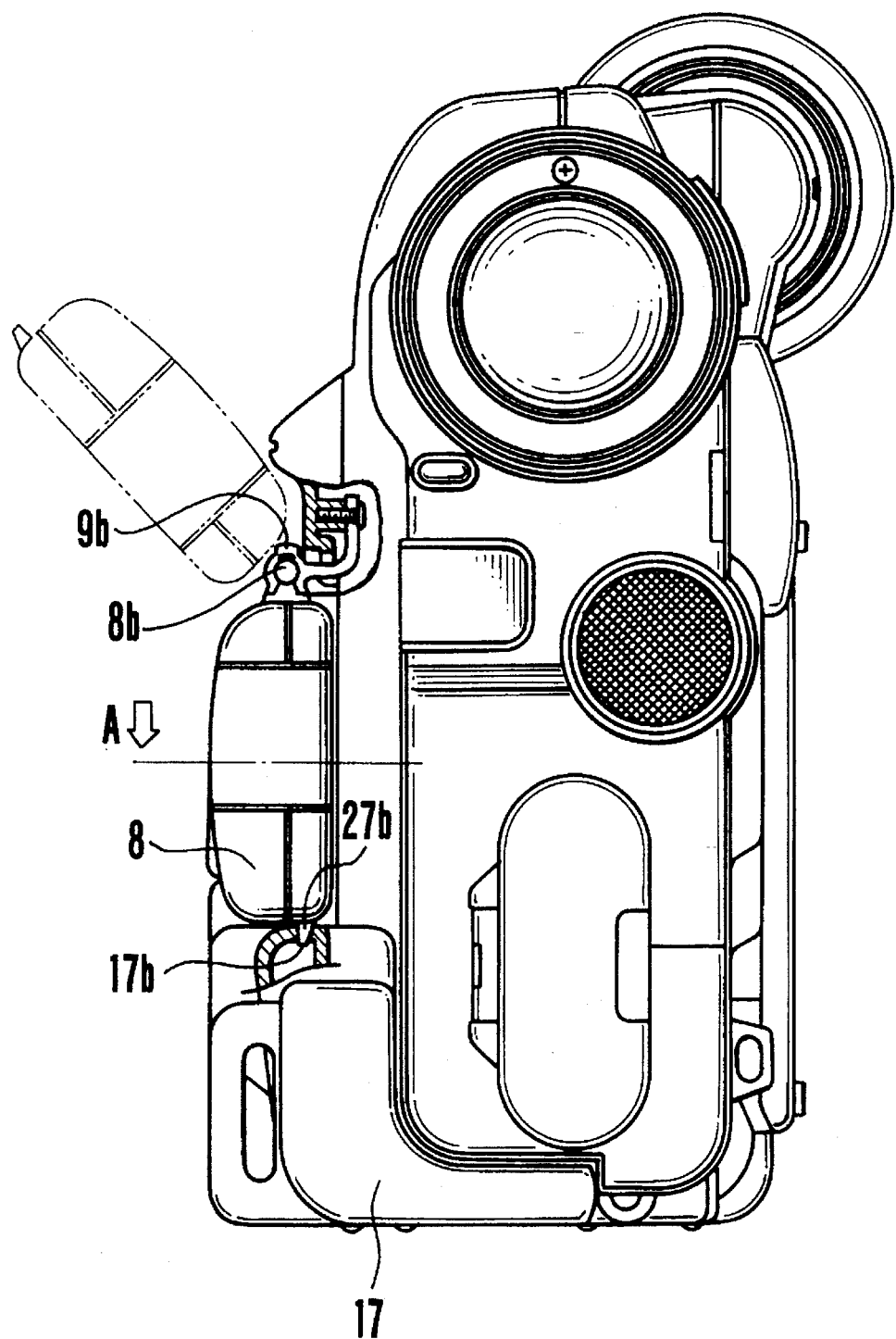
FIG. 7 is an illustration for explaining an operating method of a remote controller and shows the remote controller in a state of being mounted on a VTR casing.
Figure 8:
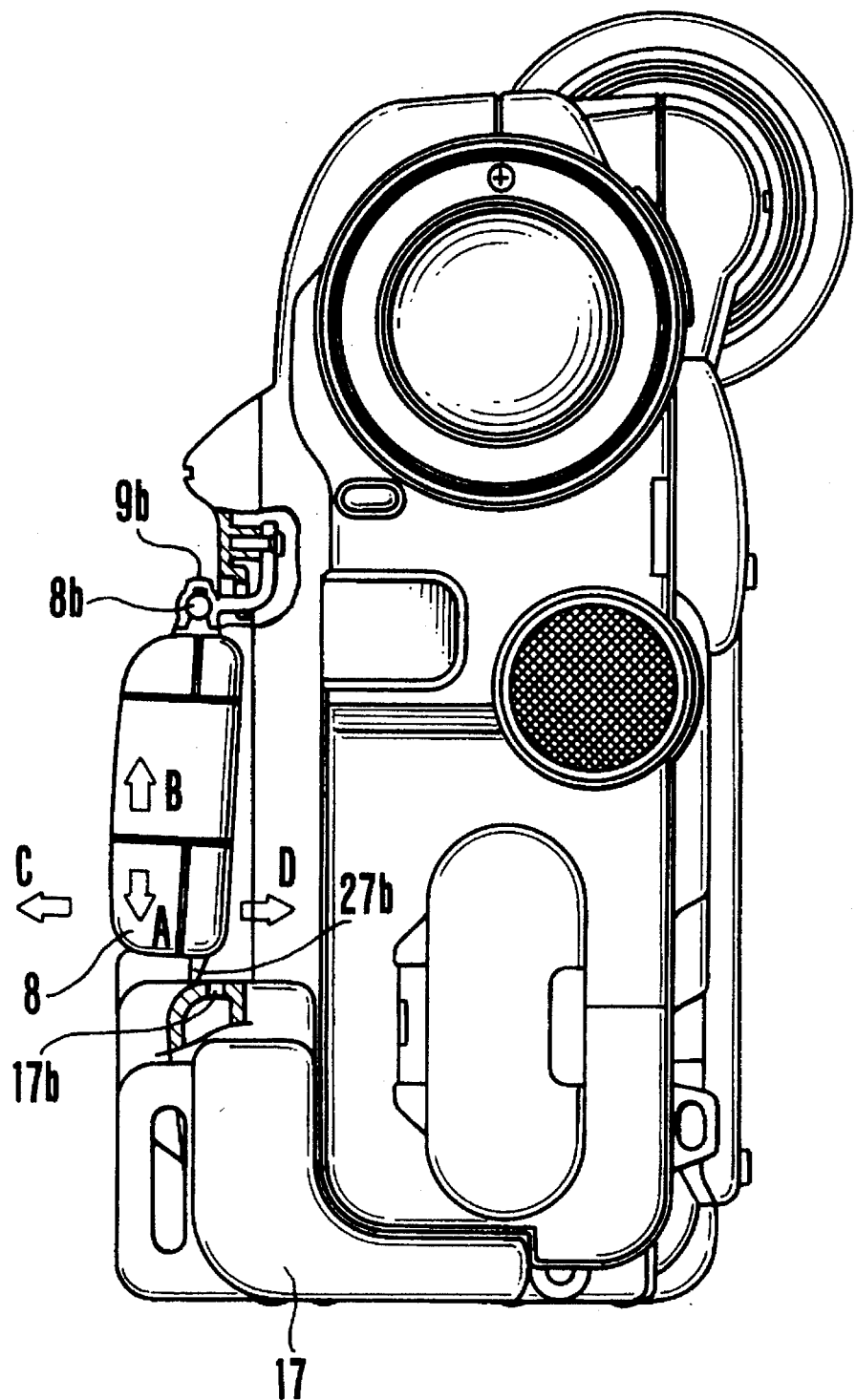
FIG. 8 is an illustration for explaining the operating method of the remote controller and shows the remote controller in a state of being unlocked from a cover.
Figure 9:
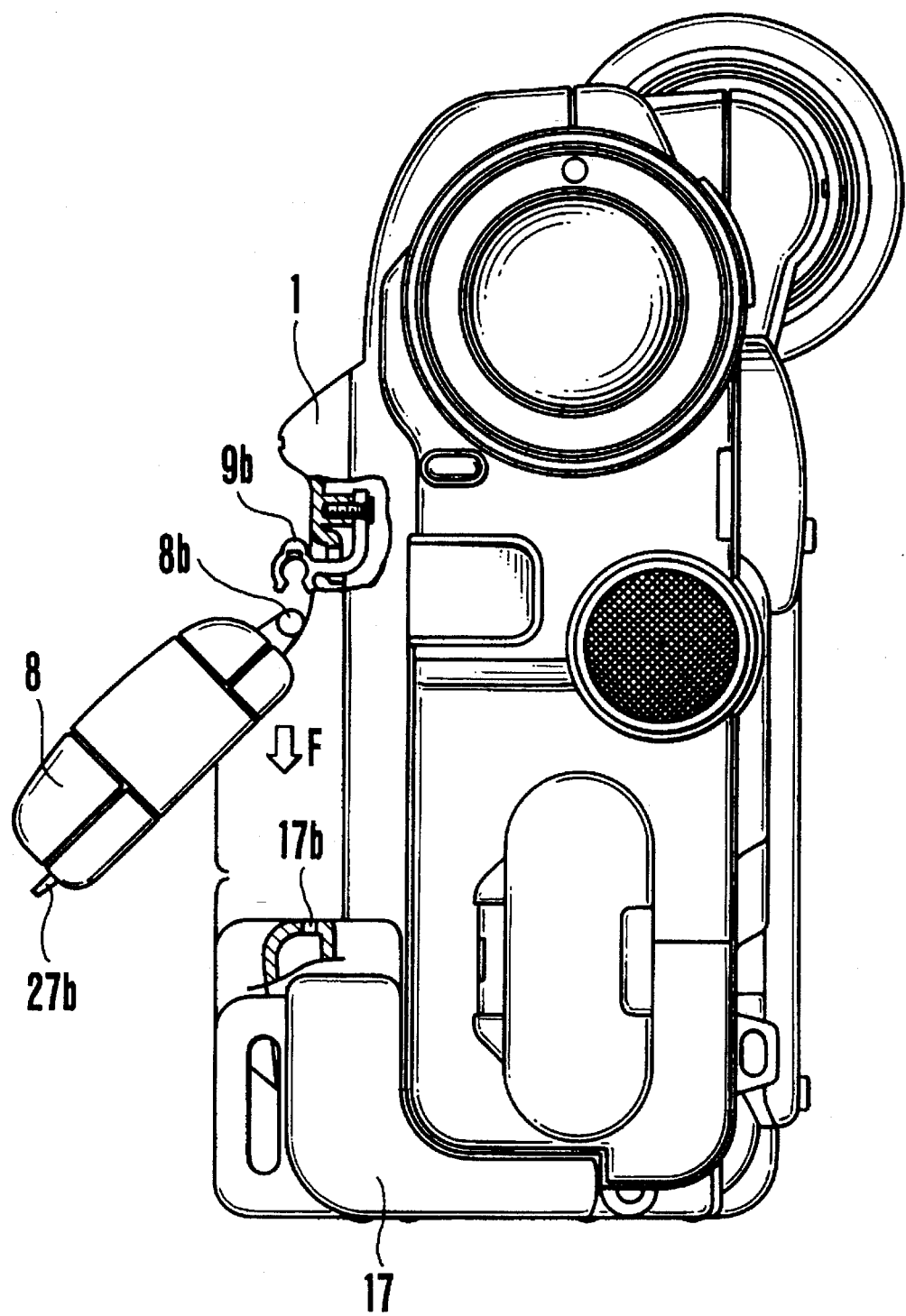
FIG. 9 is an illustration for explaining a method for attaching and detaching the remote controller and shows the remote controller in a state of having been removed from the VTR casing.

At the time of reproduction, the remote controller 8 is pushed, from a state indicated with full lines in FIG. 7, in the direction of arrow B as shown in FIG. 8. In this case, the engaging parts 9a and 9b are pushed by the remote controller 8 through the engaging parts 8a and 8b against the urging force, so that the remote controller 8 can be disengaged from the cover 17. Therefore, the position of the remote controller 8 can be easily changed to the broken line position of FIG. 7 by moving it in the direction of arrow C. For changing the reproducing position of the remote controller 8 to a recording position, the remote controller 8 is pushed, from its position of FIG. 8, in the direction of arrow D. Then, since the remote controller 8 is pushed in the direction of arrow A, as shown in FIG. 8, by the urging forces of the engaging parts 9a and 9b, the lock claws 27a and 27b are readily locked to the lock holes 17a and 17b.

Further, since remote controller 8 is arranged to transmit signals by means of infrared rays, the remote controller 8 is usable by removing it from the VTR body 1. The method for detaching and attaching the remote controller 8 from and to the VTR body 1 is described as follows with reference to FIG. 9: the lock claws 27a and 27b are first disengaged from the lock holes 17a and 17b in the above-stated manner. The remote controller 8 is then pulled in the direction of arrow F. The engaging parts 8a and 8b which are formed on the remote controller 8 then act to spread the opening parts of the engaging parts 9a and 9b to allow the remote controller 8 to be removed from the VTR casing 6. The remote controller 8 is attachable back to the VTR casing 6 in a manner reverse to the above-stated detaching action.

In the foregoing, the operation part 10 which is included in the remote controller 8 has been described as to be used for reproduction. However, the operation part 10 may be provided with operation keys for recording.

As apparent from the foregoing, in the embodiment described, the reproducing operation keys provided on the remote controller which is mounted on the VTR casing are arranged to be kept inoperable when the camera-integrated type VTR is in a shooting and image pickup state. This arrangement, therefore, enables the operator to shoot by using only a limited number of operation keys appearing on the VTR body without being bothered by the presence of other unnecessary operation keys. At the time of reproduction, the reproducing operation can be carried out by using only the operation keys provided on the remote controller also without being bothered by other operation keys.

Further, in shooting, the remote controller engages the lockable cover in a state of covering the recording medium ejecting part which contains the recording medium for recording image pickup information. Under this condition, therefore, the above-stated reproducing operation keys are kept in an inoperable position. This arrangement not only gives the above-stated advantageous effect but also permits the use of the remote controller as a grip in shooting. Further, with the operation part allowed to engage the cover, the tape cassette mounting part can be protected from an external force.

Further, since the remote controller is arranged to be attachable and detachable to and from the VTR body, the embodiment permits a remote reproducing operation.

What is claimed is:

1. A camera-integrated type recorder apparatus comprising:
   a) a camera part;
   b) a recorder part arranged to record an image pickup signal outputted from said camera part;
   c) a casing arranged to house said camera part and said recorder part therein; and
   d) an operation part arranged to be rotatable between a first position and a second position and having operation keys provided on a first surface of said operation part for reproducing recorded image information and a grip formed on a second surface opposed to the first surface of said operation part, said operation part being arranged such that, when said apparatus is in a shooting state, said operation part is kept in a first position where the first surface is concealed to make said operation keys inoperable and, when said apparatus is in a reproducing state, said operation part is kept in a second position which is located away from the first position to make said operation keys operable.

2. An apparatus according to claim 1, wherein said operation part is arranged to be attachable to and detachable from said casing and to serve as a remote control unit when said operation part is detached from said casing.

3. A camera-integrated type recorder apparatus comprising:
   a) a camera part;
   b) a recorder part arranged to record an image pickup signal outputted from said camera part;
   c) a casing arranged to house said camera part and said recorder part therein;
   d) a package mounting part arranged to mount and demount a package housing a recording medium on and from said recorder part;
   e) a cover arranged to be lockable in a state of covering said package mounting part and to inhibit the package from being mounted and demounted when said package mounting part is covered by said cover;
   f) first locking means for locking said cover;
   g) second locking means different from said first locking means; and
   h) an operation part having operation keys for reproducing recorded image information, said operation part being arranged such that, when said apparatus is in a shooting state, said operation part is locked to said cover by said second locking means to be kept in a position in which said operation keys are concealed.

4. An apparatus according to claim 3, wherein said operation part is arranged to be attachable to and detachable from said casing and to serve as a remote control unit when said operation part is detached from said casing.

5. A video camera arranged to record on a recording medium a video signal obtained by an image pickup action and to reproduce the video signal from the recording medium, wherein:
   said video camera has two surfaces of substantially same area and four surfaces smaller than said two surfaces, one of said two surfaces being provided thereon with the image pickup operation keys related to image pickup and recording and being provided with a plurality of projections, the plurality of projections being arranged for placement in contact with a support surface to support the camera body in a balanced fashion on the projections, and the other of said two surfaces being provided thereon with reproducing operation keys related to reproduction and a mounting mechanism for mounting the recording medium.

6. A video camera according to claim 5, wherein said reproducing operation keys are arranged on an operation board of a rotatable member which is mounted on said first side, said rotatable member being rotatable between a first position and a second position and arranged to be exposed when said rotatable member is in said first position and not to be exposed when said rotatable member is in said second position.

7. A video camera according to claim 6, wherein said rotatable member is attachable to and detachable from said first side and has a function of transmitting information on an operation of said reproducing operation keys to said camera body.

8. A camera-integrated type recorder apparatus comprising:
   a) a camera part;
   b) a recorder part arranged to record an image pickup signal outputted from said camera part;
   c) a casing arranged to house said camera part and said recorder part therein;
   d) a package mounting part arranged to mount and demount a package housing a recording medium on and from said recorder part;

e) grip means including:
   a first grip part arranged to be capable of opening and closing a package insertion/removal opening at said package mounting part at a first position adjacent to said package mounting part;
   second grip part arranged to be openable and closable at a second position adjacent to said package mounting part and having a plurality of operation keys for operating said recorder apparatus, said second grip part concealing said operation keys when said second grip part is in a closed condition and being arranged to permit operating said operation keys when said second grip part is in an open condition;
   said first and second grip parts being arranged to be in a closed condition to permit holding said recorder apparatus when said recorder apparatus is operated to record the image pickup signal outputted from said camera part; and f) a cover arranged to be formed a part of a surface of the apparatus, movable with the package mounting part.

9. A recorder apparatus according to claim 8, wherein said first and second grip parts are arranged such that, when said recorder apparatus is held by a user for an operation to record the image pickup signal outputted from said camera part, said package mounting part is kept closed jointly by said first and second grip parts to inhibit the package from being mounted on and demounted from said package mounting part and, when said first and second grip parts are in an open condition, the package is allowed to be mounted on and demounted from said package mounting part.

10. An apparatus according to claim 9, wherein said operation part is arranged to be attachable to and detachable from said casing and to serve as a remote control unit when said operation part is detached from said casing.

11. A video camera according to claim 9, wherein said operation keys relate to reproduction.

12. A video camera according to claim 9, wherein said operation part is capable of engaging said grip in the shooting state.

13. An integrated video camera and video recorder apparatus, using a package having a recording medium comprising:
   a) a camera portion;
   b) a recording portion connected to the camera portion for recording on a package a video signal provided by the camera portion, the package being selectively insertable in and removable from the apparatus;
   c) a casing for housing therein the camera and recording portions, the casing having formed therein a package access opening for accommodating insertion and removal of the package into and from the apparatus; and
   d) a remote control unit having operating buttons for operating the apparatus from a distance by wireless transmission of operation signals;
   wherein the casing includes means for selectively attaching the remote control unit to the apparatus in a position such that the remote control unit covers at least a portion of the package access opening.

14. An apparatus according to claim 13, wherein the operation buttons of the remote control unit include buttons for controlling video signal playback by the recording portion.

15. An apparatus according to claim 14, wherein the means for selectively attaching the remote control unit includes means for mounting the remote control unit for pivotal motion between a first position in which the operating buttons are exposed and a second position in which the remote control unit covers at least a portion of the package access opening and the operating buttons are hidden.

16. An integrated video camera and video cassette recorder apparatus using a package housing a recording medium comprising:
   a) a camera portion;
   b) a recording portion connected to the camera portion for recording on a package a video signal provided by the camera portion, the recording portion including a packing mounting mechanism movable between an operation position for mounting the package for operation with the recording portion and an ejection position for inserting the package in or removing the package from the apparatus;
   c) a casing for housing therein the camera and recording portions, the casing having formed therein an access opening for accommodating movement of the mounting mechanism between the operation position and the ejection position; and
   d) a remote control unit having operating buttons for operating the apparatus from a distance by wireless transmission of operating signals;
   wherein the casing includes means for selectively attaching the remote control unit to the apparatus in a position such that the remote control unit covers at least a portion of the access opening.

17. An apparatus according to claim 16 wherein the operation buttons of the remote control unit include buttons for controlling video signal playback by the recording portion.

18. An apparatus according to claim 17, wherein the means for selectively attaching the remote control unit includes means for mounting the remote control unit for pivotal motion between a first position in which the operating buttons are exposed and a second position in which the remote control unit covers at least a portion of the access opening and the operating buttons are hidden.

* * * * *